United States Patent
Childers et al.

(10) Patent No.: US 7,965,950 B2
(45) Date of Patent: Jun. 21, 2011

(54) PERFORMANCE OPTIMIZED RECEIVER WITH BANDWIDTH ADAPTIVE OPTICAL FILTER FOR HIGH SPEED LONG HAUL WDM SYSTEMS

(75) Inventors: Mark Childers, Finksburg, MD (US); Shan Zhong, Ellicott City, MD (US); Xiaohui Yang, Odenton, MD (US)

(73) Assignee: Ciena Corporation, Linthicum, MD (US)

( * ) Notice: Subject to any disclaimer, the term of this patent is extended or adjusted under 35 U.S.C. 154(b) by 797 days.

(21) Appl. No.: 11/872,176

(22) Filed: Oct. 15, 2007

(65) Prior Publication Data
US 2009/0097849 A1   Apr. 16, 2009

(51) Int. Cl.
*H04B 10/06* (2006.01)

(52) U.S. Cl. .......................... 398/212; 398/209; 398/213

(58) Field of Classification Search .................... 398/79, 398/202, 206–213
See application file for complete search history.

(56) References Cited

U.S. PATENT DOCUMENTS

| | | | | |
|---|---|---|---|---|
| 5,357,097 A | * | 10/1994 | Shiozawa et al. | 250/205 |
| 6,043,922 A | * | 3/2000 | Koga et al. | 398/213 |
| 2009/0080880 A1 | * | 3/2009 | Lee et al. | 398/14 |

* cited by examiner

*Primary Examiner* — Dzung D Tran
(74) *Attorney, Agent, or Firm* — Clements Bernard PLLC; Christopher L. Bernard; Jeffrey M. Measures

(57) ABSTRACT

The present invention provides a performance optimized receiver with a bandwidth adaptive optical filter for high speed long haul wavelength division multiplexed systems, such as 40 Gb/s and 100 Gb/s wavelength division multiplexed systems. The performance optimized receiver includes: a bandwidth and wavelength tunable optical filter, wherein the bandwidth and wavelength tunable optical filter is operable for receiving a plurality of wavelengths associated with a wavelength division multiplexed signal and passing one or more selected wavelengths, and wherein the bandwidth and wavelength tunable optical filter is operable for adjusting the bandwidth of each of the one or more selected wavelengths; and a receiver coupled to the bandwidth and wavelength tunable optical filter. Preferably, the receiver includes one or more of a bit error rate monitoring module and a signal quality monitoring module operable for monitoring the one or more selected wavelengths and providing feedback to the bandwidth and wavelength tunable optical filter such that the bandwidth and wavelength tunable optical filter adaptively adjusts the bandwidth of each of the one or more selected wavelengths.

15 Claims, 9 Drawing Sheets

PERFORMANCE OPTIMIZED RECEIVER WITH BANDWIDTH ADAPTIVE OPTICAL FILTER FOR HIGH SPEED LONG HAUL WDM SYSTEMS

FIELD OF THE INVENTION

The present invention relates generally to the optical networking field. More specifically, the present invention relates to a performance optimized receiver (Rx) with a bandwidth (BW) adaptive optical filter for high speed long haul wavelength division multiplexed (WDM) systems, such as 40 Gb/s and 100 Gb/s WDM systems. This BW adaptive optical filter consists of a BW and wavelength tunable optical filter and supports reconfigurable optical add/drop multiplexing (ROADM) functionality.

BACKGROUND OF THE INVENTION

As compared to conventional 10 Gb/s wavelength division multiplexed (WDM) systems, high speed long haul WDM systems, such as 40 Gb/s and 100 Gb/s WDM systems, have approximately 16 times tighter tolerances on chromatic dispersion (CD), 4 times tighter tolerances on polarization mode dispersion (PMD), and 6 dB higher optical signal-to-noise ratio (OSNR) requirements in order to be effective. In addition, such high speed long haul WDM systems are more sensitive to nonlinearities. Thus, performance must be optimized at each and every link—every dB counts. Because margins are so tight, adaptive systems are necessary—continually compensating for changing operating conditions.

CD occurs because different colored pulses of light, with different wavelengths, travel at different speeds through optical fiber, even within the same mode. CD is the sum of material dispersion and waveguide dispersion. Material dispersion is caused by variations in the refractive index of the glass of an optical fiber as a function of frequency. Waveguide dispersion is caused by the distribution of light between the core of the optical fiber and the cladding of the optical fiber, especially with regard to single-mode fiber (SMF). CD concerns are compounded in today's high speed long haul WDM systems.

Slope mismatch dispersion is a subset of CD, and occurs in SMF because dispersion varies with wavelength. Thus, dispersion builds up, especially at the extremes of a band of wavelength channels. Slope mismatch dispersion compensation typically requires slope matching and/or tunable dispersion compensation at a receiver (Rx).

PMD results as light travels down an optical fiber in two inherent polarization modes. When the core of the optical fiber is asymmetric, the light traveling along one polarization mode travels faster or slower than the light traveling along the other polarization mode, resulting in a pulse overlapping with others, or distorting the pulse to such a degree that it is undetectable by the Rx. Again, PMD concerns are compounded in today's high speed long haul WDM systems. Further, PMD varies dynamically with temperature changes, infinitesimal asymmetries in the optical fiber core, etc., and therefore requires adaptively tunable dispersion compensation.

Regardless of the modulation format used for 40 Gb/s or 100 Gb/s WDM systems, it has been demonstrated theoretically and experimentally that the bandwidth (BW) of the Rx has an enormous impact on overall system performance, although the optimized BW varies with modulation format, for example. Currently, most Rxs include an optical filter that has been BW optimized for a given modulation format (as well as a given data rate, power level, OSNR, residual dispersion, etc.) through simulations and experiments. Typically, this optical filter is realized as a thin film, fiber Bragg grating (FBG), or planar lightwave circuit (PLC) based device. Any change in modulation format and/or any of the other characteristics of the transmission system requires a new optical filter design. In addition, manufacturing tolerances can often prevent the optical filter from demonstrating BW optimized properties. Thus, what is needed in the art is a performance optimized Rx with a BW adaptive optical filter that compensates for changes in modulation format and/or any of the other characteristics of the transmission system.

BRIEF SUMMARY OF THE INVENTION

In various exemplary embodiments, the present invention provides a performance optimized receiver (Rx) with a bandwidth (BW) adaptive optical filter for high speed long haul wavelength division multiplexed (WDM) systems, such as 40 Gb/s and 100 Gb/s WDM systems. This BW adaptive optical filter consists of a BW and wavelength tunable optical filter and supports reconfigurable optical add/drop multiplexing (ROADM) functionality. Advantageously, the bandwidth tunable Rx of the present invention accommodates data rate changes in the next generation return-to-zero-differential quadrature phase shift keying (RZ-DQPSK) systems (e.g. for a 40 G application the baud rate is 22 Gb/s and for a 100 G application the baud rate is 28 Gb/s). In general, the selection of the return-to-zero (RZ) pulse duration shifts the optimized bandwidth.

In one exemplary embodiment, the present invention provides a performance optimized receiver with a bandwidth adaptive optical filter for high speed long haul wavelength division multiplexed systems, such as 40 Gb/s and 100 Gb/s wavelength division multiplexed systems, the performance optimized receiver including: a bandwidth and wavelength tunable optical filter, wherein the bandwidth and wavelength tunable optical filter is operable for receiving a plurality of wavelengths associated with a wavelength division multiplexed signal and passing one or more selected wavelengths, and wherein the bandwidth and wavelength tunable optical filter is operable for adjusting the bandwidth of each of the one or more selected wavelengths; and a receiver coupled to the bandwidth and wavelength tunable optical filter. Preferably, the receiver includes one or more of a bit error rate monitoring module and a signal quality monitoring module operable for monitoring the one or more selected wavelengths and providing feedback to the bandwidth and wavelength tunable optical filter such that the bandwidth and wavelength tunable optical filter adaptively adjusts the bandwidth of each of the one or more selected wavelengths. Optionally, the bandwidth and wavelength tunable optical filter includes: a demultiplexer operable for receiving and demultiplexing the plurality of wavelengths associated with the wavelength division multiplexed signal; and a plurality of bandwidth and wavelength tunable optical filters coupled to the demultiplexer, each of the plurality of bandwidth and wavelength tunable optical filters operable for receiving one or more of the demultiplexed plurality of wavelengths. Optionally, the bandwidth and wavelength tunable optical filter is operable for receiving a plurality of wavelengths associated with a wavelength division multiplexed signal and passing a plurality of selected wavelengths, wherein the bandwidth and wavelength tunable optical filter is operable for adjusting the bandwidth of each of the plurality of selected wavelengths. In such a case, the performance optimized receiver includes a demultiplexer operable for demultiplexing the plurality of selected wavelengths disposed between the bandwidth and wavelength tunable optical filter and the receiver. Preferably, the bandwidth and wavelength tunable optical filter supports reconfigurable optical add/drop multiplexing functionality.

In another exemplary embodiment, the present invention provides a method for providing a performance optimized receiver with a bandwidth adaptive optical filter for high speed long haul wavelength division multiplexed systems, such as 40 Gb/s and 100 Gb/s wavelength division multiplexed systems, the method including: providing a bandwidth and wavelength tunable optical filter, wherein the bandwidth and wavelength tunable optical filter is operable for receiving a plurality of wavelengths associated with a wavelength division multiplexed signal and passing one or more selected wavelengths, and wherein the bandwidth and wavelength tunable optical filter is operable for adjusting the bandwidth of each of the one or more selected wavelengths; and providing a receiver coupled to the bandwidth and wavelength tunable optical filter. Preferably, the receiver includes one or more of a bit error rate monitoring module and a signal quality monitoring module operable for monitoring the one or more selected wavelengths and providing feedback to the bandwidth and wavelength tunable optical filter such that the bandwidth and wavelength tunable optical filter adaptively adjusts the bandwidth of each of the one or more selected wavelengths. Optionally, the bandwidth and wavelength tunable optical filter includes: a demultiplexer operable for receiving and demultiplexing the plurality of wavelengths associated with the wavelength division multiplexed signal; and a plurality of bandwidth and wavelength tunable optical filters coupled to the demultiplexer, each of the plurality of bandwidth and wavelength tunable optical filters operable for receiving one or more of the demultiplexed plurality of wavelengths. Optionally, the bandwidth and wavelength tunable optical filter is operable for receiving a plurality of wavelengths associated with a wavelength division multiplexed signal and passing a plurality of selected wavelengths, wherein the bandwidth and wavelength tunable optical filter is operable for adjusting the bandwidth of each of the plurality of selected wavelengths. In such a case, the method includes providing a demultiplexer operable for demultiplexing the plurality of selected wavelengths disposed between the bandwidth and wavelength tunable optical filter and the receiver. Preferably, the bandwidth and wavelength tunable optical filter supports reconfigurable optical add/drop multiplexing functionality.

In a further exemplary embodiment, the present invention provides a performance optimized receiver with a bandwidth adaptive optical filter for high speed long haul wavelength division multiplexed systems, such as 40 Gb/s and 100 Gb/s wavelength division multiplexed systems, the performance optimized receiver including: a bandwidth and wavelength tunable optical filter, wherein the bandwidth and wavelength tunable optical filter is operable for receiving a plurality of wavelengths associated with a wavelength division multiplexed signal and passing one or more selected wavelengths, and wherein the bandwidth and wavelength tunable optical filter is operable for adjusting the bandwidth of each of the one or more selected wavelengths; and a receiver coupled to the bandwidth and wavelength tunable optical filter, wherein the receiver includes one or more of a bit error rate monitoring module and a signal quality monitoring module operable for monitoring the one or more selected wavelengths and providing feedback to the bandwidth and wavelength tunable optical filter such that the bandwidth and wavelength tunable optical filter adaptively adjusts the bandwidth of each of the one or more selected wavelengths. Optionally, the bandwidth and wavelength tunable optical filter includes: a demultiplexer operable for receiving and demultiplexing the plurality of wavelengths associated with the wavelength division multiplexed signal; and a plurality of bandwidth and wavelength tunable optical filters coupled to the demultiplexer, each of the plurality of bandwidth and wavelength tunable optical filters operable for receiving one or more of the demultiplexed plurality of wavelengths. Optionally, the bandwidth and wavelength tunable optical filter is operable for receiving a plurality of wavelengths associated with a wavelength division multiplexed signal and passing a plurality of selected wavelengths, and wherein the bandwidth and wavelength tunable optical filter is operable for adjusting the bandwidth of each of the plurality of selected wavelengths. In such a case, the performance optimized receiver includes a demultiplexer operable for demultiplexing the plurality of selected wavelengths disposed between the bandwidth and wavelength tunable optical filter and the receiver. Preferably, the bandwidth and wavelength tunable optical filter supports reconfigurable optical add/drop multiplexing functionality.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

Figure 1:
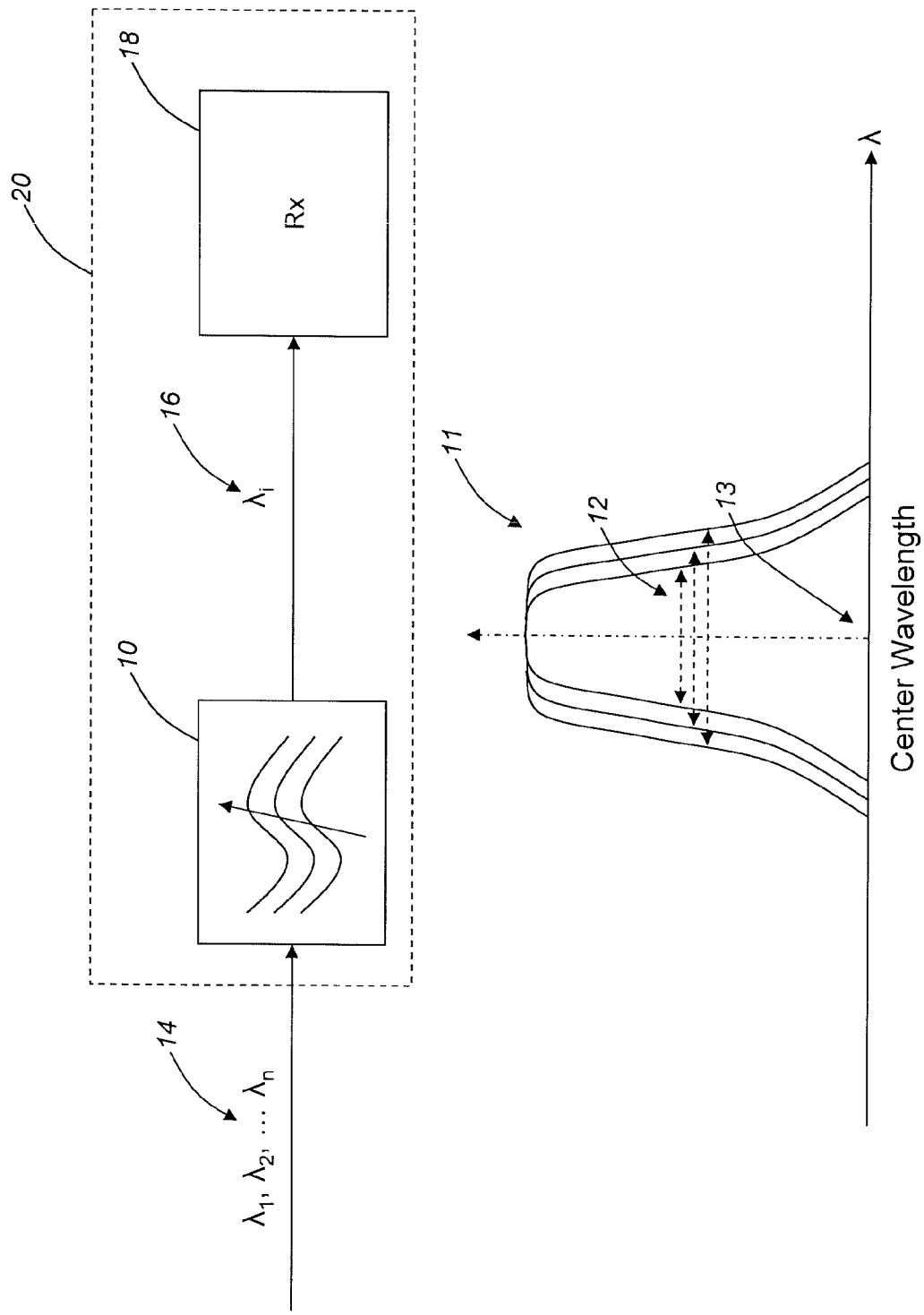
FIG. 1 is a schematic diagram illustrating one exemplary embodiment of the performance optimized receiver (Rx) of the present invention and a graph illustrating the performance of the associated bandwidth (BW) and wavelength tunable optical filter.

Again, the present invention provides a performance optimized receiver (Rx) with a bandwidth (BW) adaptive optical filter for high speed long haul wavelength division multiplexed (WDM) systems, such as 40 Gb/s and 100 Gb/s WDM systems. Referring to FIG. 1, this BW adaptive optical filter consists of a BW and wavelength tunable optical filter 10 and supports reconfigurable optical add/drop multiplexing (ROADM) functionality. The performance of the BW and wavelength tunable optical filter 10 is illustrated by the graph 11 of FIG. 1. This graph 11 illustrates that both the BW 12 and the center wavelength 13 of the BW and wavelength tunable optical filter 10 are independently adjustable. The BW and wavelength tunable optical filter 10 is operable for receiving a plurality of wavelengths, $\lambda_1, \lambda_2, \ldots \lambda_n$ 14, and passing only one or more selected wavelengths, $\lambda_i$ 16. Preferably, the BW and wavelength tunable optical filter 10 is implemented in front of a Rx 18, such as a 40 Gb/s optical duo-binary Rx, to form the performance optimized Rx 20 of the present invention.

Figure 2:
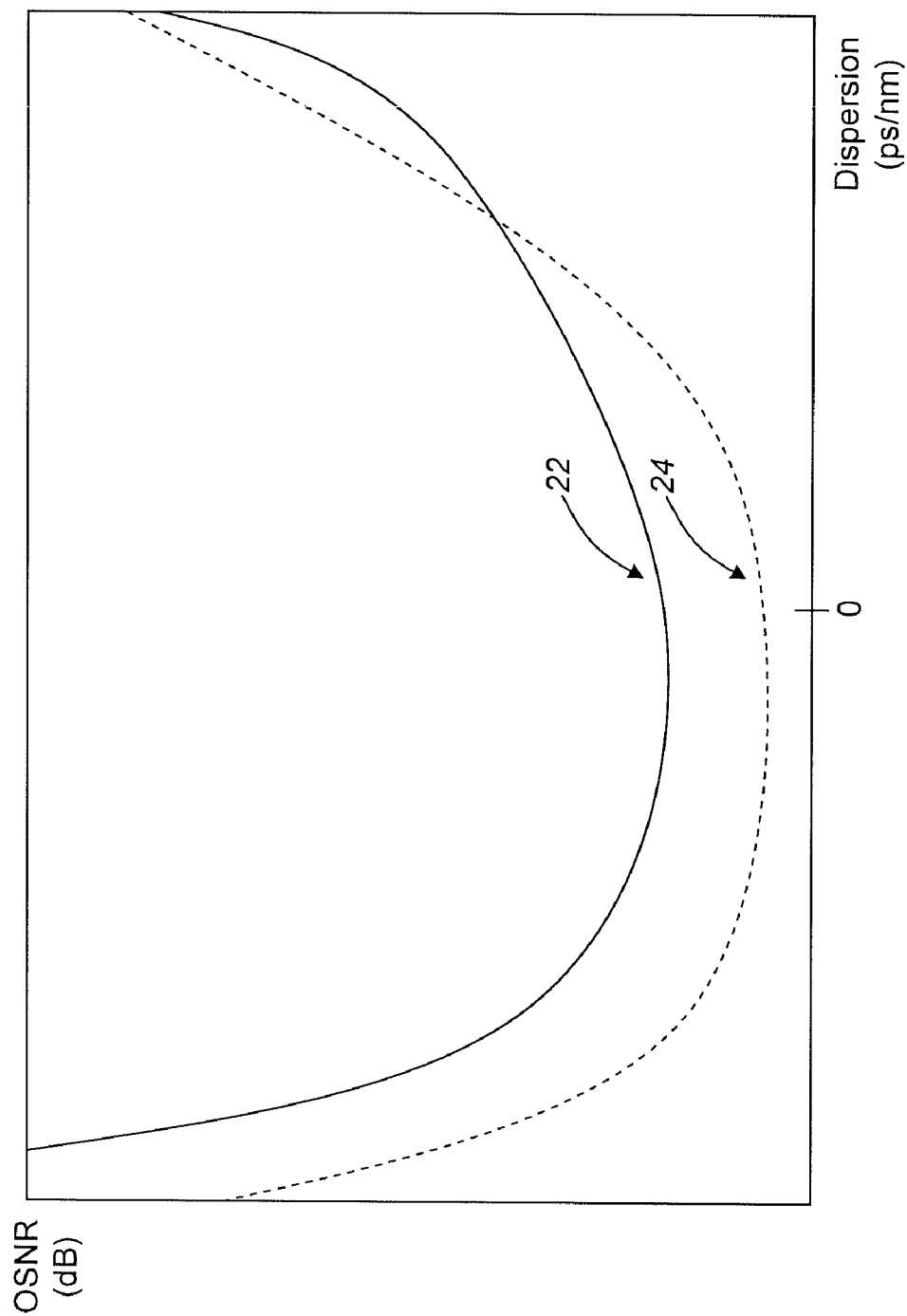
FIG. 2 is a graph illustrating the performance of the performance optimized Rx of FIG. 1 (Optical Signal-to-Noise Ratio (OSNR) vs. Dispersion)
Figure 3:
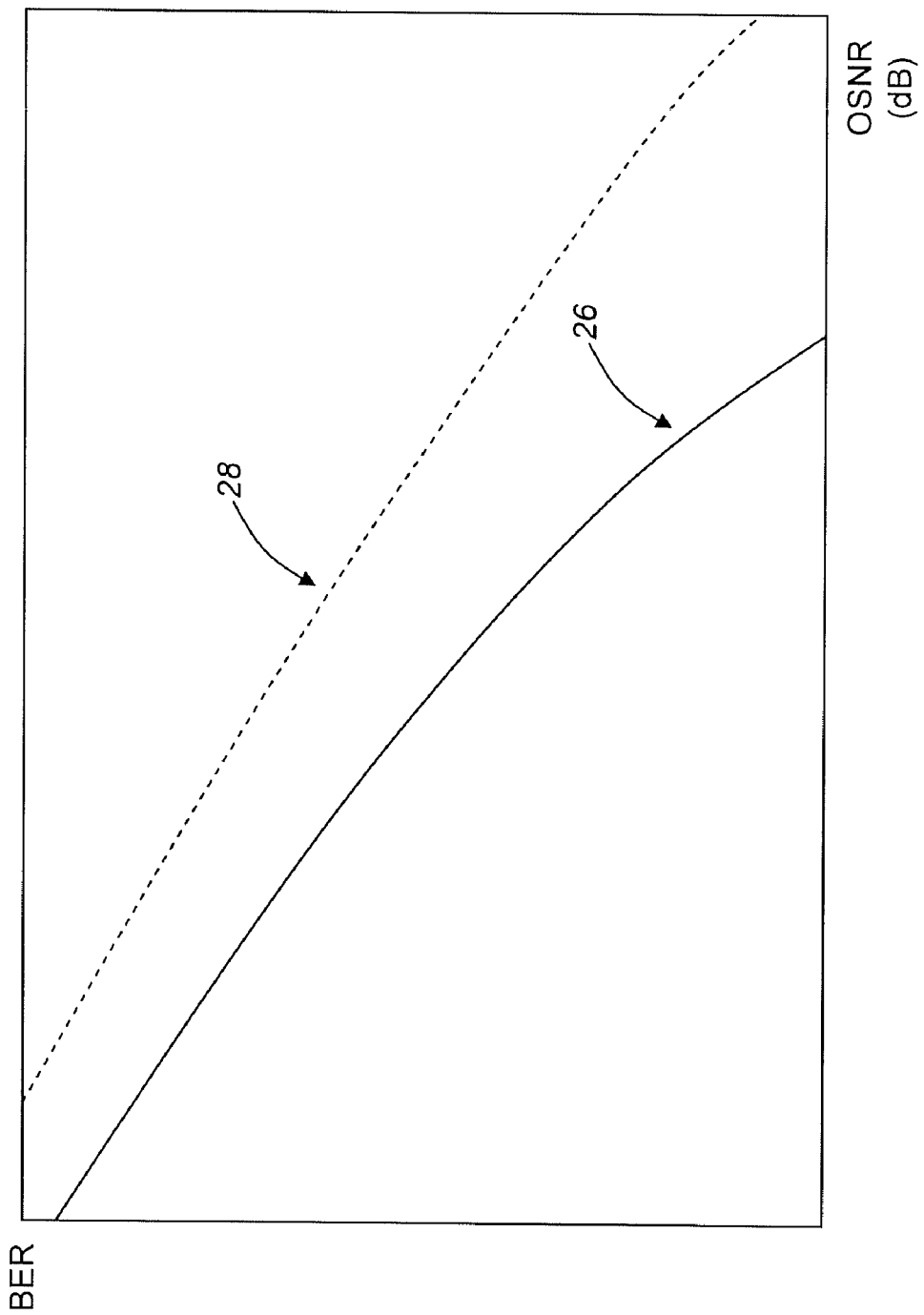
FIG. 3 is a graph illustrating the performance of the performance optimized Rx of FIG. 1 (Bit Error Rate (BER) vs. OSNR)

Referring to FIG. 2, it can be seen that, by implementing the BW and wavelength tunable optical filter 10 in front of the Rx 18, a higher optical signal-to-noise ratio (OSNR) may be achieved (the solid curve 22 vs. the dashed curve 24), by about 1 dB, for example. Likewise, referring to FIG. 3, it can be seen that, for a given OSNR, a lower bit error rate (BER) may be achieved using the performance optimized Rx 20 of the present invention (the solid curve 26) than using a conventional 50 GHz multiplex (MUX)/demultiplex (DEMUX) arrayed waveguide grating (AWG) (the dashed curve 28), for example.

Figure 4:
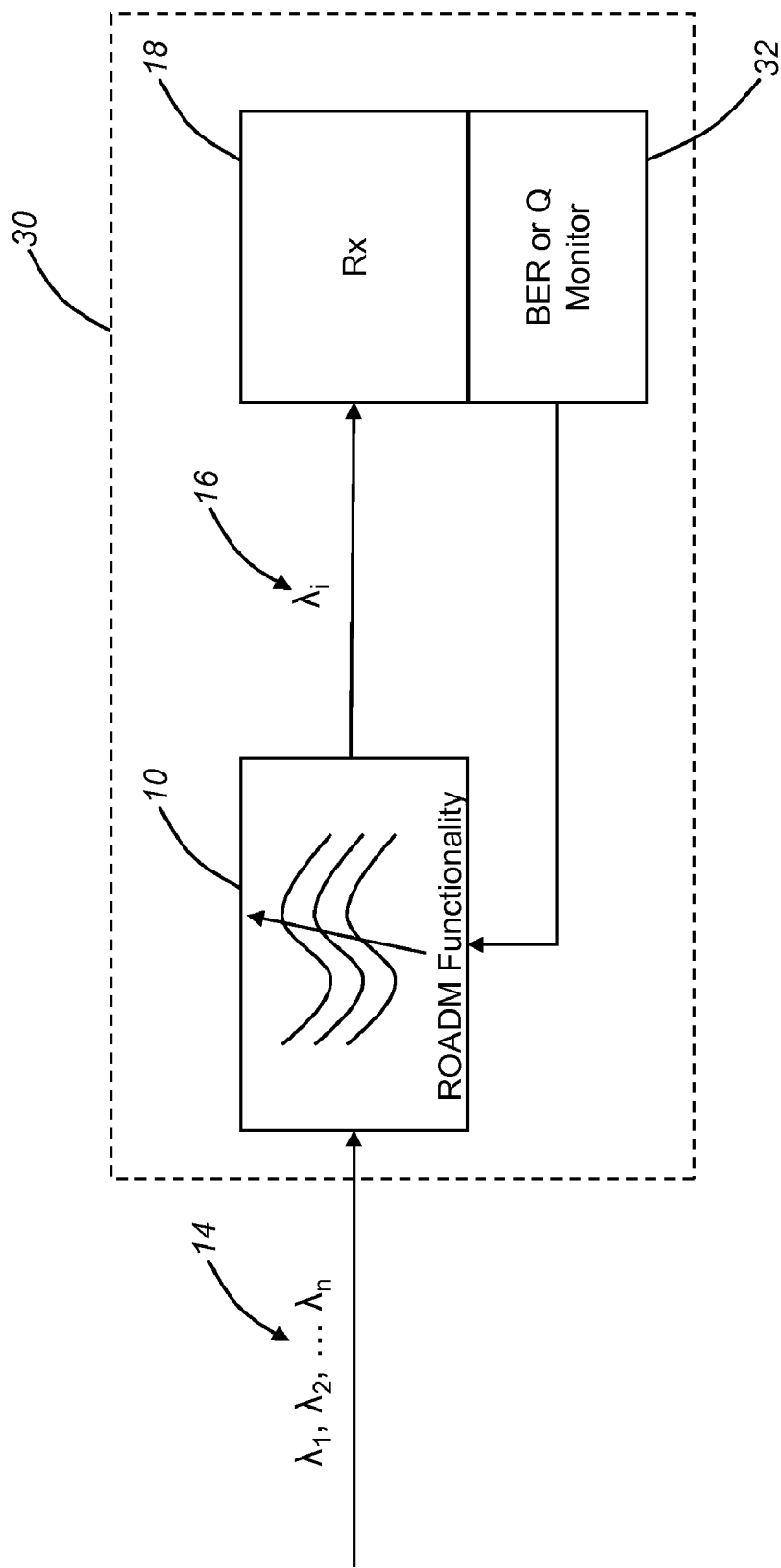
FIG. 4 is a schematic diagram illustrating another exemplary embodiment of the performance optimized Rx of the present invention.

Referring to FIG. 4, again, the BW adaptive optical filter consists of a BW and wavelength tunable optical filter 10 and supports ROADM functionality. The performance of the BW and wavelength tunable optical filter 10 is illustrated by the graph 11 of FIG. 1. This graph 11 illustrates that both the BW 12 and the center wavelength 13 of the BW and wavelength tunable optical filter 10 are independently adjustable. The BW and wavelength tunable optical filter 10 is operable for receiving a plurality of wavelengths, $\lambda_1, \lambda_2, \ldots \lambda_n$ 14, and passing only one or more selected wavelengths, $\lambda_i$ 16. Preferably, the BW and wavelength tunable optical filter 10 is implemented in front of a Rx 18, such as a 40 Gb/s optical duo-binary Rx, to form the performance optimized Rx 30 of the present invention. In this alternative embodiment, the Rx 18 includes a BER and/or signal quality (Q) monitoring module 32, using forwarding error correction (FEC) coding or the like, operable for providing feedback to the BW and wavelength tunable optical filter 10, such that the BW adaptive optical filter is truly BW adaptive.

Figure 5:
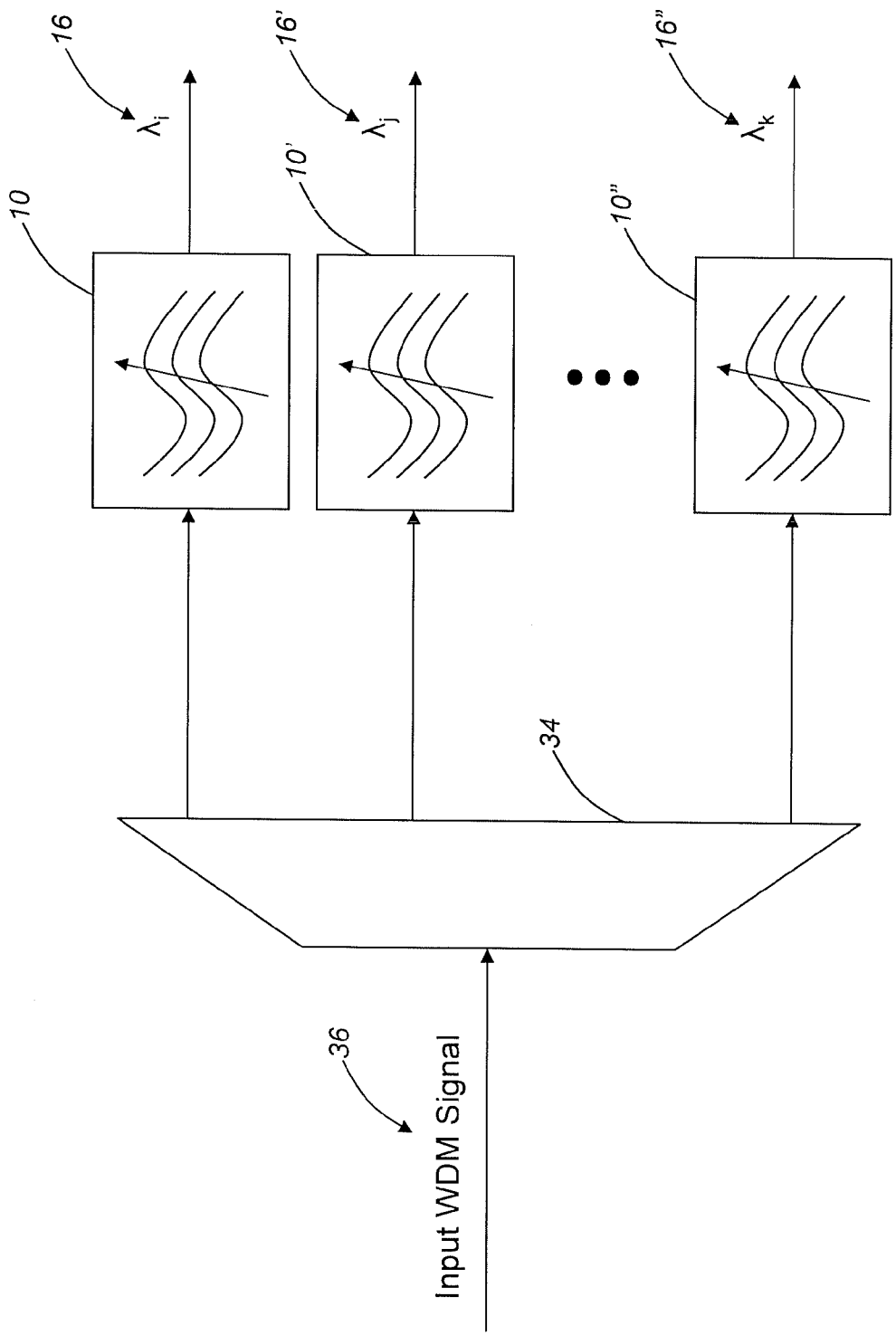
FIG. 5 is a schematic diagram illustrating a practical implementation of the performance optimized Rx of FIGS. 1 and 4.

Referring to FIG. 5, in a practical implementation of the performance optimized Rx 20 (FIG. 1) and 30 (FIG. 4) of the present invention, a 1×N BW/wavelength tunable DEMUX may be built by combining a 1×N optical splitter 34 with N BW tunable optical filters 10, 10', and 10". Thus, an input WDM signal 36 is split into its constituent wavelengths or groups of wavelengths, $\lambda_i$ 16, $\lambda_j$ 16', and $\lambda_k$ 16", and then the bandwidth of each wavelength or group of wavelengths, $\lambda_i$ 16, $\lambda_j$ 16', and $\lambda_k$ 16", is then tuned. Depending on the power budget, N may be between 4 and 8, for example. Preferably, each BW tunable optical filter 10, 10', and 10" is adjusted independently based on the BER of the channel(s). If all of the channels are using the same modulation format, the optimized BW of the channels will be very close.

Figure 6:
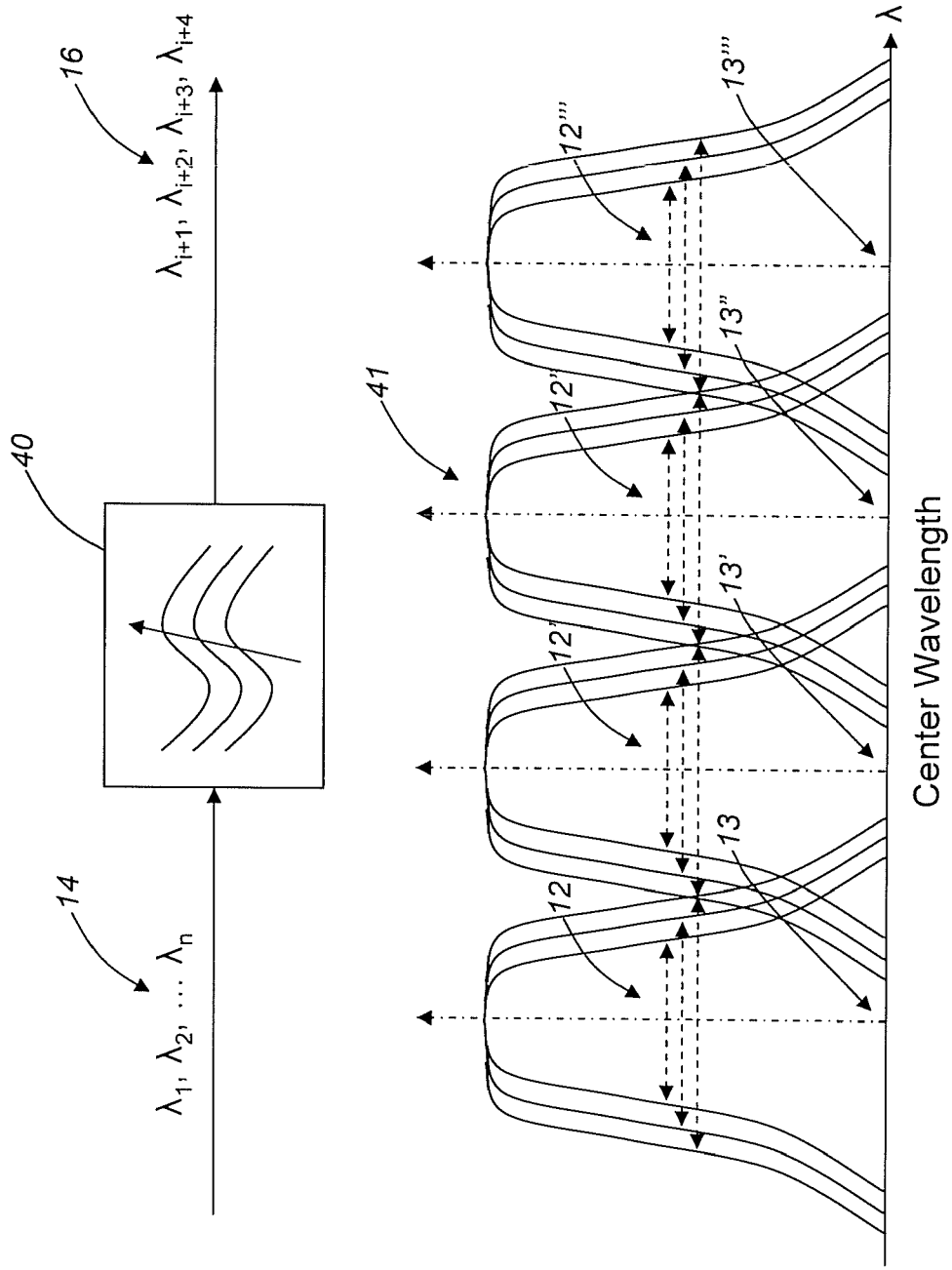
FIG. 6 is a schematic diagram illustrating one exemplary embodiment of a one-in/one-out multi-channel BW and wavelength tunable optical filter of the present invention and a graph illustrating its performance.

Referring to FIG. 6, if all of the channels are using the same modulation format, a one-in/one-out multi-channel BW and wavelength tunable optical filter 40 may be used. This one-in/one-out multi-channel BW and wavelength tunable optical filter 40 is operable for simultaneously passing and adjusting the bandwidth of N selected channels, such as 4 to 8 selected channels. The performance of the one-in/one-out multi-channel BW and wavelength tunable optical filter 40 is illustrated by the graph 41 of FIG. 6. This graph 41 illustrates that both the BW 12, 12', 12", and 12''' and the center wavelength 13, 13', 13", and 13''' of each of the passed channels are independently adjustable. The one-in/one-out multi-channel BW and wavelength tunable optical filter 40 is operable for receiving a plurality of wavelengths, $\lambda_1, \lambda_2, \ldots \lambda_n$ 14, and passing a plurality of selected bandwidth adjusted wavelengths, $\lambda_{i+1}, \lambda_{i+2}, \lambda_{i+3}$, and $\lambda_{i+4}$ 16. Preferably, the one-in/one-out multi-channel BW and wavelength tunable optical filter 40 is implemented in front of a Rx 18 (FIGS. 1 and 4), such as a 40 Gb/s optical duo-binary Rx, to form the performance optimized Rx 20 (FIG. 1) or 30 (FIG. 4) of the present invention.

Referring to FIG. 7, again, if all of the channels are using the same modulation format, a one-in/one-out multi-channel BW and wavelength tunable optical filter 40 may be used. This one-in/one-out multi-channel BW and wavelength tunable optical filter 40 is operable for simultaneously passing and adjusting the bandwidth of N selected channels, such as 4 to 8 selected channels. The performance of the one-in/one-out multi-channel BW and wavelength tunable optical filter 40 is illustrated by the graph 41 of FIG. 6. This graph 41 illustrates that both the BW 12, 12', 12", and 12''' and the center wavelength 13, 13', 13", and 13''' of each of the passed channels are independently adjustable. The one-in/one-out multi-channel BW and wavelength tunable optical filter 40 is operable for receiving a plurality of wavelengths, $\lambda_1, \lambda_2, \ldots \lambda_n$ 14, and passing a plurality of selected bandwidth adjusted wavelengths, $\lambda_{i+1}, \lambda_{i+2}, \lambda_{i+3}$, and $\lambda_{i+4}$ 16. Preferably, the one-in/one-out multi-channel BW and wavelength tunable optical filter 40 is implemented in front of a Rx 18 (FIGS. 1 and 4), such as a 40 Gb/s optical duo-binary Rx, to form the performance optimized Rx 20 (FIG. 1) or 30 (FIG. 4) of the present invention. In this alternative embodiment, a colorless AWG DEMUX is disposed between the one-in/one-out multi-channel BW and wavelength tunable optical filter 40 and the Rx 18, thereby separating the plurality of selected bandwidth adjusted wavelengths, $\lambda_{i+1}$ 16, $\lambda_{i+2}$ 16', $\lambda_{i+3}$ 16", and $\lambda_{i+4}$ 16'''.

The methodologies of the present invention are very robust—adaptively optimizing the BW (and performance) of the Rxs used. This is especially important in dynamic reconfigurable WDM systems, where imperfect filtering caused by uncertain numbers of ROADM nodes may now be compensated for on-the-fly. A flexible DEMUX design suitable for use with different modulation formats has now been provided.

Figure 7:
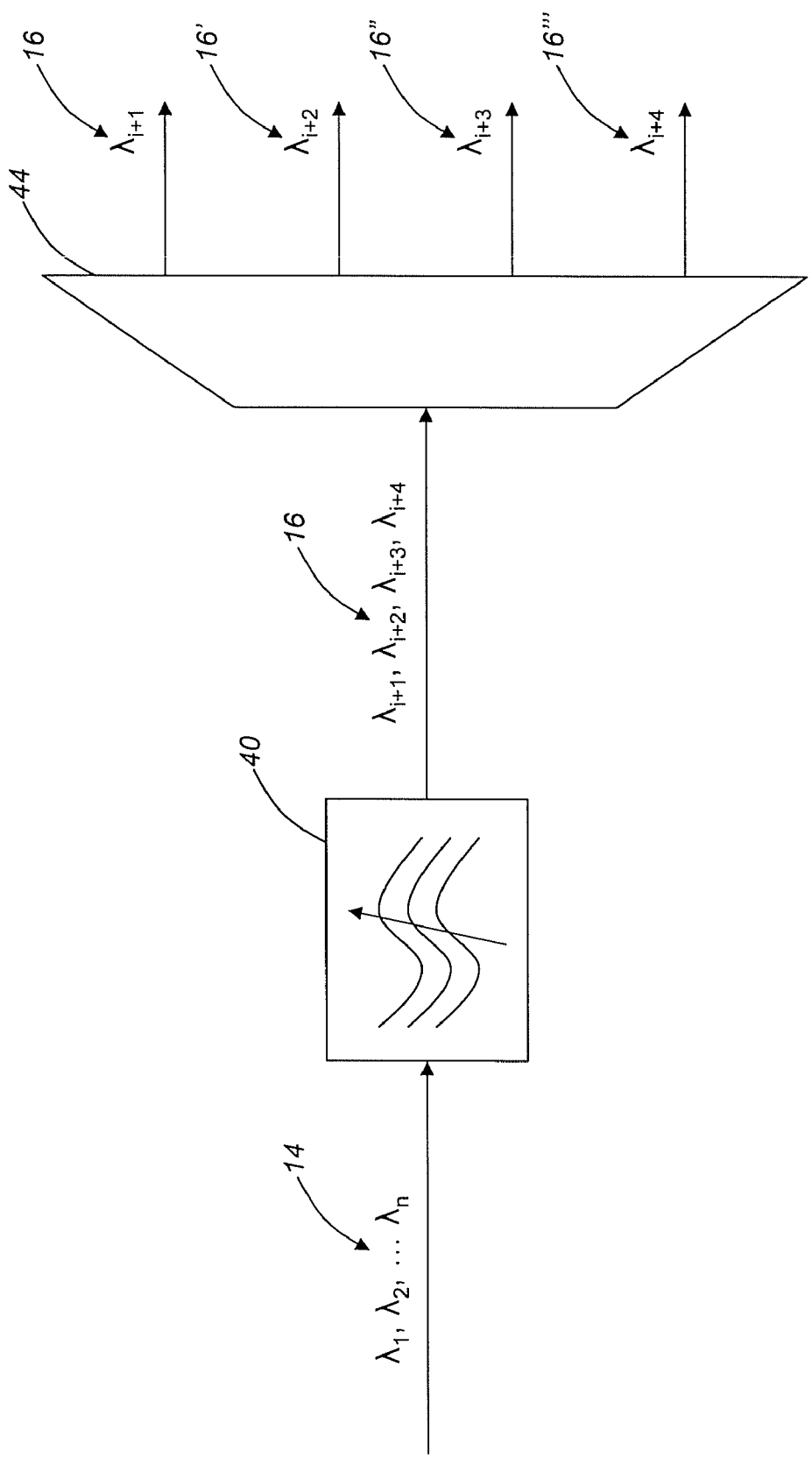
FIG. 7 is a schematic diagram illustrating the one-in/one-out multi-channel BW and wavelength tunable optical filter of FIG. 7 followed by a colorless arrayed waveguide grating (AWG) demultiplexer (DEMUX)
Figure 8:
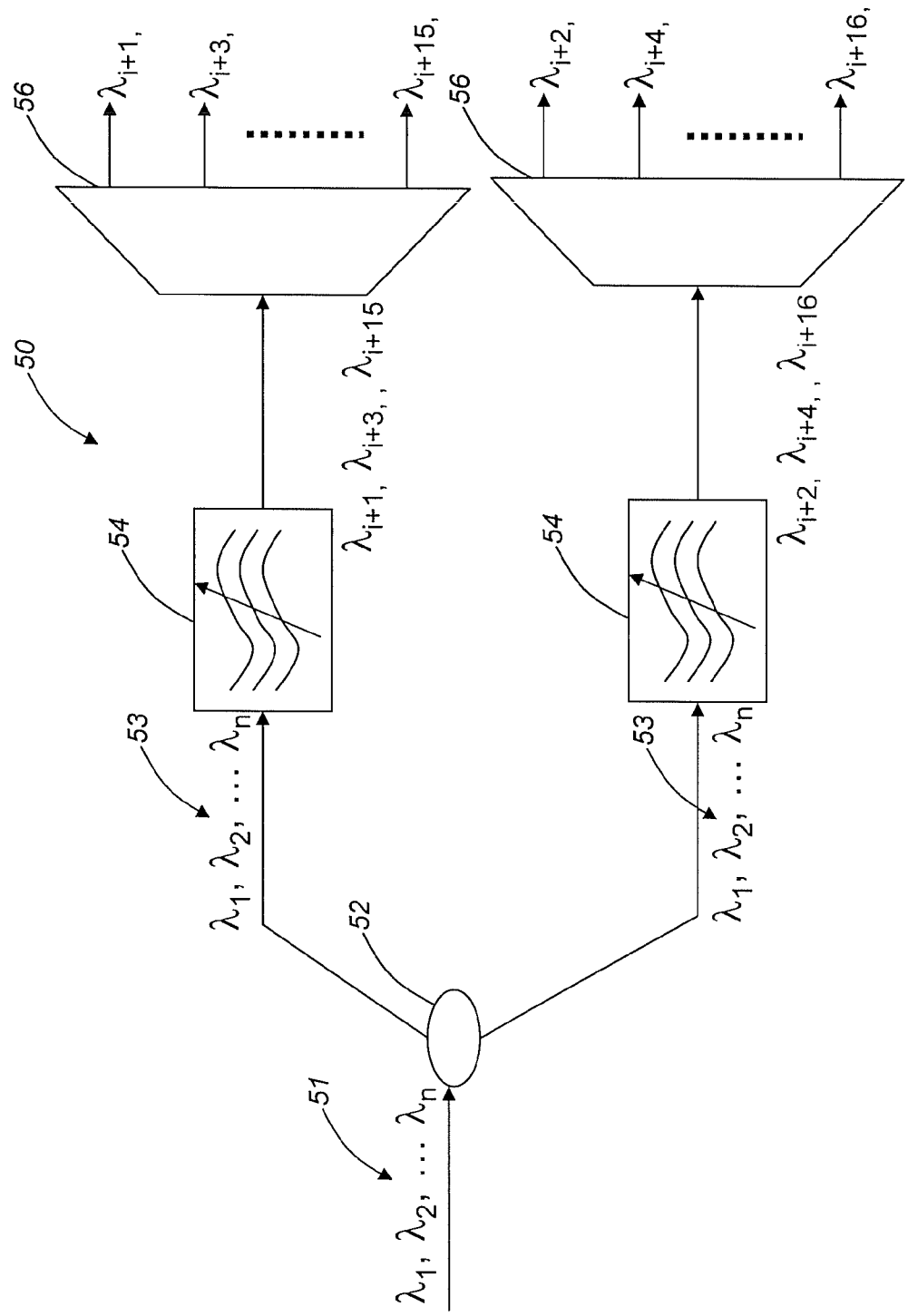
FIG. 8 is a schematic diagram illustrating one exemplary embodiment of a 50 GHz channel spacing DEMUX using a 100 GHz channel spacing multi-channel BW and wavelength tunable optical filter.
Figure 9:
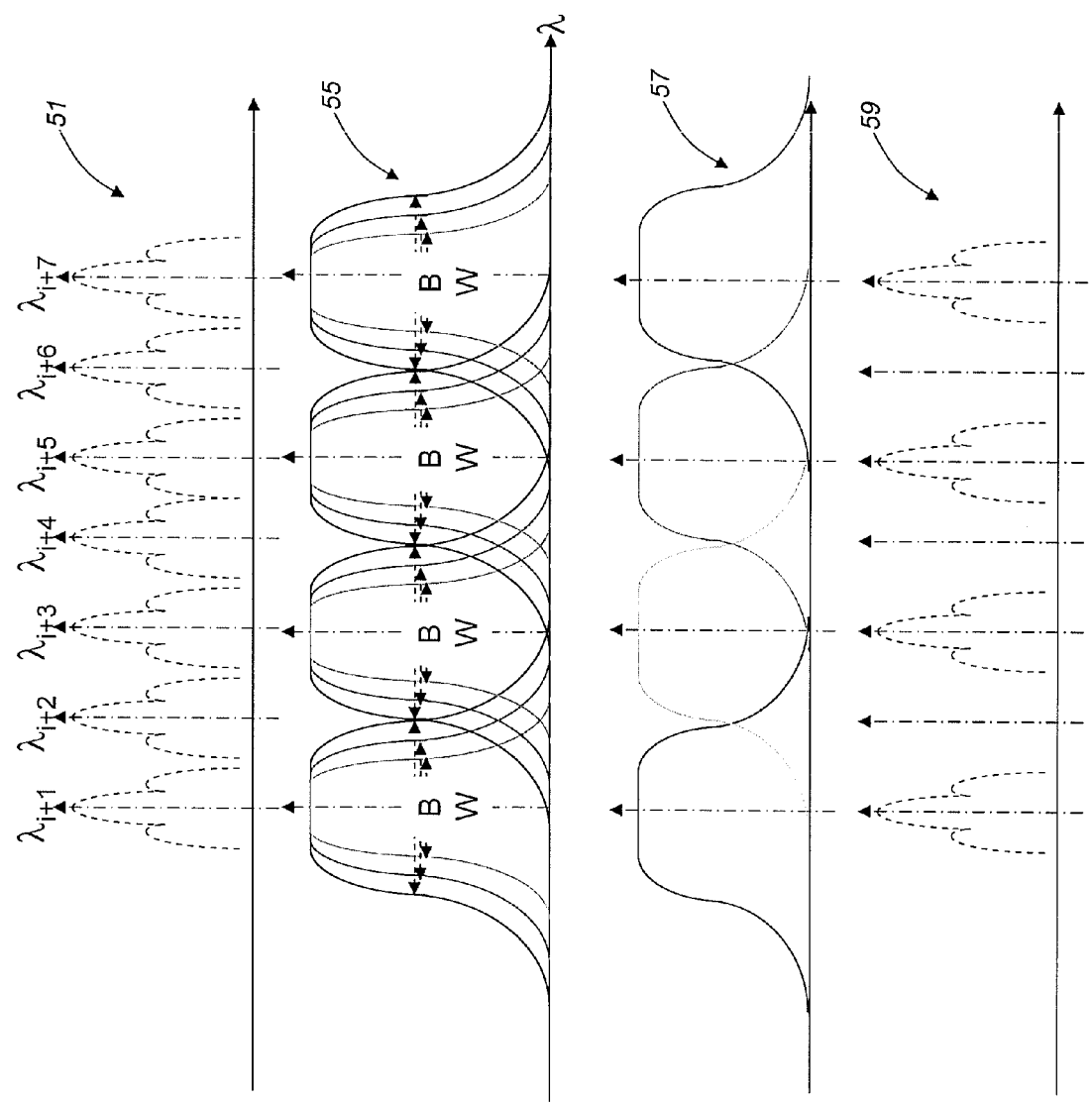
FIG. 9 is a series of graphs illustrating the performance of the 50 GHz channel spacing DEMUX using the 100 GHz channel spacing multi-channel BW and wavelength tunable optical filter of FIG. 8.

Due to technological limitations, it may be most likely to build a multi-channel BW and wavelength tunable optical filter at 100 GHz or 200 GHz channel spacing (i.e. FIG. 6), as well as a bandwidth tunable DEMUX at 100 GHz or 200 GHz channel spacing (i.e. FIG. 7). In order to build a higher density bandwidth tunable DEMUX, the architecture of FIG. 8 is utilized. FIG. 8 illustrates one exemplary embodiment of a 50 GHz channel spacing DEMUX using a 100 GHz channel spacing multi-channel BW and wavelength tunable optical filter. FIG. 9 illustrates the performance of the 50 GHz channel spacing DEMUX using the 100 GHz channel spacing multi-channel BW and wavelength tunable optical filter.

Referring to FIG. 8, the 50 GHz channel spacing DEMUX using the 100 GHz channel spacing multi-channel BW and wavelength tunable optical filter 50 includes a 1×2 splitter 52 or the like operable for first receiving the incoming WDM signals at 50 GHz channel spacing 51. These split WDM signals 53 are then received by a plurality of multi-channel BW and wavelength tunable optical filters at 100 GHz channel spacing 54 and, finally, a plurality of colorless 1×8 AWGs at 100 GHz channel spacing 56 or the like. FIG. 9 illustrates the incoming WDM signals at 50 GHz channel spacing 51, the pass-band of the multi-channel BW and wavelength tunable optical filters at 100 GHz channel spacing 55, the passband of the colorless 1×8 AWGs at 100 GHz channel spacing 57, and the filtered 50 GHz channel spacing signals 59.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A performance optimized receiver with a bandwidth adaptive optical filter for high speed long haul wavelength division multiplexed systems, such as 40 Gb/s and 100 Gb/s wavelength division multiplexed systems, the performance optimized receiver comprising:
   a tunable optical filter, wherein the tunable optical filter is operable for receiving a plurality of wavelengths associated with a wavelength division multiplexed signal and passing one or more selected wavelengths, and wherein the tunable optical filter is operable for adjusting the bandwidth of each of the one or more selected wavelengths, wherein the tunable optical filter comprises an optical filter with independently adjustable bandwidth and center wavelength of the bandwidth; and
   a receiver coupled to the tunable optical filter, wherein the receiver comprises one or more of a bit error rate monitoring module and a signal quality monitoring module operable for monitoring the one or more selected wavelengths and providing feedback to the tunable optical filter such that the tunable optical filter adaptively adjusts the bandwidth of each of the one or more selected wavelengths.

2. The performance optimized receiver of claim 1, wherein the tunable optical filter comprises a first tunable optical filter, and the first tunable optical filter comprises:
   a demultiplexer operable for receiving and demultiplexing the plurality of wavelengths associated with the wavelength division multiplexed signal; and
   a plurality of second tunable optical filters coupled to the demultiplexer, each of the plurality of second tunable optical filters operable for receiving one or more of the demultiplexed plurality of wavelengths.

3. The performance optimized receiver of claim 1, wherein the tunable optical filter is operable for receiving a plurality of wavelengths associated with a wavelength division multiplexed signal and passing a plurality of selected wavelengths, and wherein the tunable optical filter is operable for adjusting the bandwidth of each of the plurality of selected wavelengths.

4. The performance optimized receiver of claim 3, further comprising a demultiplexer operable for demultiplexing the plurality of selected wavelengths disposed between the tunable optical filter and the receiver.

5. The performance optimized receiver of claim 1, wherein the tunable optical filter supports reconfigurable optical add/drop multiplexing functionality.

6. A method for providing a performance optimized receiver with a bandwidth adaptive optical filter for high speed long haul wavelength division multiplexed systems, such as 40 Gb/s and 100 Gb/s wavelength division multiplexed systems, the method comprising:
   providing a tunable optical filter, wherein the tunable optical filter is operable for receiving a plurality of wavelengths associated with a wavelength division multiplexed signal and passing one or more selected wavelengths, and wherein the tunable optical filter is operable for adjusting the bandwidth of each of the one or more selected wavelengths, and wherein the tunable optical filter comprises an optical filter with independently adjustable bandwidth and center wavelength of the bandwidth; and
   providing a receiver coupled to the tunable optical filter, wherein the receiver comprises one or more of a bit error rate monitoring module and a signal quality monitoring module operable for monitoring the one or more selected wavelengths and providing feedback to the tunable optical filter such that the tunable optical filter adaptively adjusts the bandwidth of each of the one or more selected wavelengths.

7. The method of claim 6, wherein the tunable optical filter comprises a first tunable optical filter, and the first tunable optical filter comprises:
   a demultiplexer operable for receiving and demultiplexing the plurality of wavelengths associated with the wavelength division multiplexed signal; and
   a plurality of second tunable optical filters coupled to the demultiplexer, each of the plurality of second tunable optical filters operable for receiving one or more of the demultiplexed plurality of wavelengths.

8. The method of claim 6, wherein the tunable optical filter is operable for receiving a plurality of wavelengths associated with a wavelength division multiplexed signal and passing a plurality of selected wavelengths, and wherein the tunable optical filter is operable for adjusting the bandwidth of each of the plurality of selected wavelengths.

9. The method of claim 8, further comprising providing a demultiplexer operable for demultiplexing the plurality of selected wavelengths disposed between the tunable optical filter and the receiver.

10. The method of claim 6, wherein the tunable optical filter supports reconfigurable optical add/drop multiplexing functionality.

11. A performance optimized receiver with a bandwidth adaptive optical filter for high speed long haul wavelength division multiplexed systems, such as 40 Gb/s and 100 Gb/s wavelength division multiplexed systems, the performance optimized receiver comprising:
   a tunable optical filter, wherein the tunable optical filter is operable for receiving a plurality of wavelengths associated with a wavelength division multiplexed signal and passing one or more selected wavelengths, and wherein the tunable optical filter is operable for adjusting the bandwidth of each of the one or more selected wavelengths, and wherein the tunable optical filter comprises an optical filter with independently adjustable bandwidth and center wavelength of the bandwidth; and
   a receiver coupled to the tunable optical filter, wherein the receiver comprises one or more of a bit error rate monitoring module and a signal quality monitoring module operable for monitoring the one or more selected wavelengths and providing feedback to the tunable optical filter such that tunable optical filter adaptively adjusts the bandwidth of each of the one or more selected wavelengths.

12. The performance optimized receiver of claim 11, wherein the tunable optical filter comprises a first tunable optical filter, and the first tunable optical filter comprises:
   a demultiplexer operable for receiving and demultiplexing the plurality of wavelengths associated with the wavelength division multiplexed signal; and a plurality of second tunable optical filters coupled to the demultiplexer, each of the plurality of second tunable optical filters operable for receiving one or more of the demultiplexed plurality of wavelengths.

13. The performance optimized receiver of claim 11, wherein the tunable optical filter is operable for receiving a plurality of wavelengths associated with a wavelength division multiplexed signal and passing a plurality of selected wavelengths, and wherein the tunable optical filter is operable for adjusting the bandwidth of each of the plurality of selected wavelengths.

14. The performance optimized receiver of claim 13, further comprising a demultiplexer operable for demultiplexing the plurality of selected wavelengths disposed between the tunable optical filter and the receiver.

15. The performance optimized receiver of claim 11, wherein the tunable optical filter supports reconfigurable optical add/drop multiplexing functionality.

* * * * *